(12) United States Patent
Ito

(10) Patent No.: US 12,192,677 B2
(45) Date of Patent: Jan. 7, 2025

(54) IMAGE PROCESSING DEVICE

(71) Applicant: KYOCERA Document Solutions Inc., Osaka (JP)

(72) Inventor: Haruo Ito, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 170 days.

(21) Appl. No.: 17/932,258

(22) Filed: Sep. 14, 2022

(65) Prior Publication Data
US 2023/0079332 A1 Mar. 16, 2023

(30) Foreign Application Priority Data
Sep. 15, 2021 (JP) .................. 2021-150252

(51) Int. Cl.
*H04N 7/15* (2006.01)
*G06F 3/14* (2006.01)
*H04L 65/403* (2022.01)
*H04N 7/14* (2006.01)

(52) U.S. Cl.
CPC ........... *H04N 7/152* (2013.01); *G06F 3/1415* (2013.01); *H04L 65/403* (2013.01); *H04N 7/147* (2013.01)

(58) Field of Classification Search
None
See application file for complete search history.

(56) References Cited

U.S. PATENT DOCUMENTS

2014/0164958 A1* 6/2014 Mitchell ............... H04L 65/403
715/753

FOREIGN PATENT DOCUMENTS

JP    3775446 B2 *  5/2006
JP    2010-154361 A   7/2010

OTHER PUBLICATIONS

Tamaru E. with English Translation Conference Information Recording Method, Conference Information Recording Device, and Conference Information Reproducing Device; May 17, 2006; (corresponding to JP-3775446-B2).*

* cited by examiner

*Primary Examiner* — Quoc D Tran
(74) *Attorney, Agent, or Firm* — Studebaker & Brackett PC

(57) ABSTRACT

An image processing device processes a screen displayed on a monitor for a remote conference. The image processing device includes a detecting section, an acquiring section, and a generating section. The detecting section detects a difference between a first screen and a second screen. The acquiring section acquires a snapshot of the first screen and a snapshot of the second screen. The detecting section calculates an amount of change between the first screen and the second screen. When the amount of change between the first screen and the second screen is equal to or greater than a threshold, the generating section generates a document of the snapshot of the first screen acquired by the acquiring section.

2 Claims, 4 Drawing Sheets

IMAGE PROCESSING DEVICE

INCORPORATION BY REFERENCE

The present application claims priority under 35 U.S.C. § 119 to Japanese Patent Application No. 2021-150252, filed on Sep. 15, 2021. The contents of this application are incorporated herein by reference in their entirety.

BACKGROUND

The present disclosure relates to an image processing device.

Examples of conventional image processing devices for processing screen data displayed on a predetermined display device in a remote conference include a projection device, for example. The projection device includes a projecting section that projects a slide image, an imaging section that captures the projected image, a communication section that communicates with other devices, and a controller. The controller of the projection device captures the projection image using the imaging section to generate a reference image, and repeatedly captures the projected image to generate a current image. Thereafter, the controller generates change information indicating an image change by obtaining a difference between the reference image and the current image. The change information generated by the controller is successively transmitted to the other devices by the communication section. The projection device successively transmits change information generated by obtaining the difference between the reference image and the current image, thereby reducing the amount of data in communication with the other devices.

SUMMARY

To achieve the above object, an image processing device according to one aspect of the present disclosure processes screen data displayed on a display device in a remote conference. The image processing device includes a detecting section, an acquiring section, and a generating section. The detecting section compares a first screen displayed on the display device and a second screen displayed on the display device after the first screen, and detects a difference between the first screen and the second screen. The acquiring section acquires a snapshot of a screen displayed on the display device. The generating section generates a document of the snapshot. The acquiring section acquires a snapshot of the first screen and a snapshot of the second screen. The detecting section calculates the amount of change between the first screen and the second screen based on the difference between the first screen and the second screen. When a result of the calculation by the detecting section is equal to or greater than a threshold, the generating section generates a document of the snapshot of the first screen acquired by the acquiring section.

DETAILED DESCRIPTION

Figure 1:
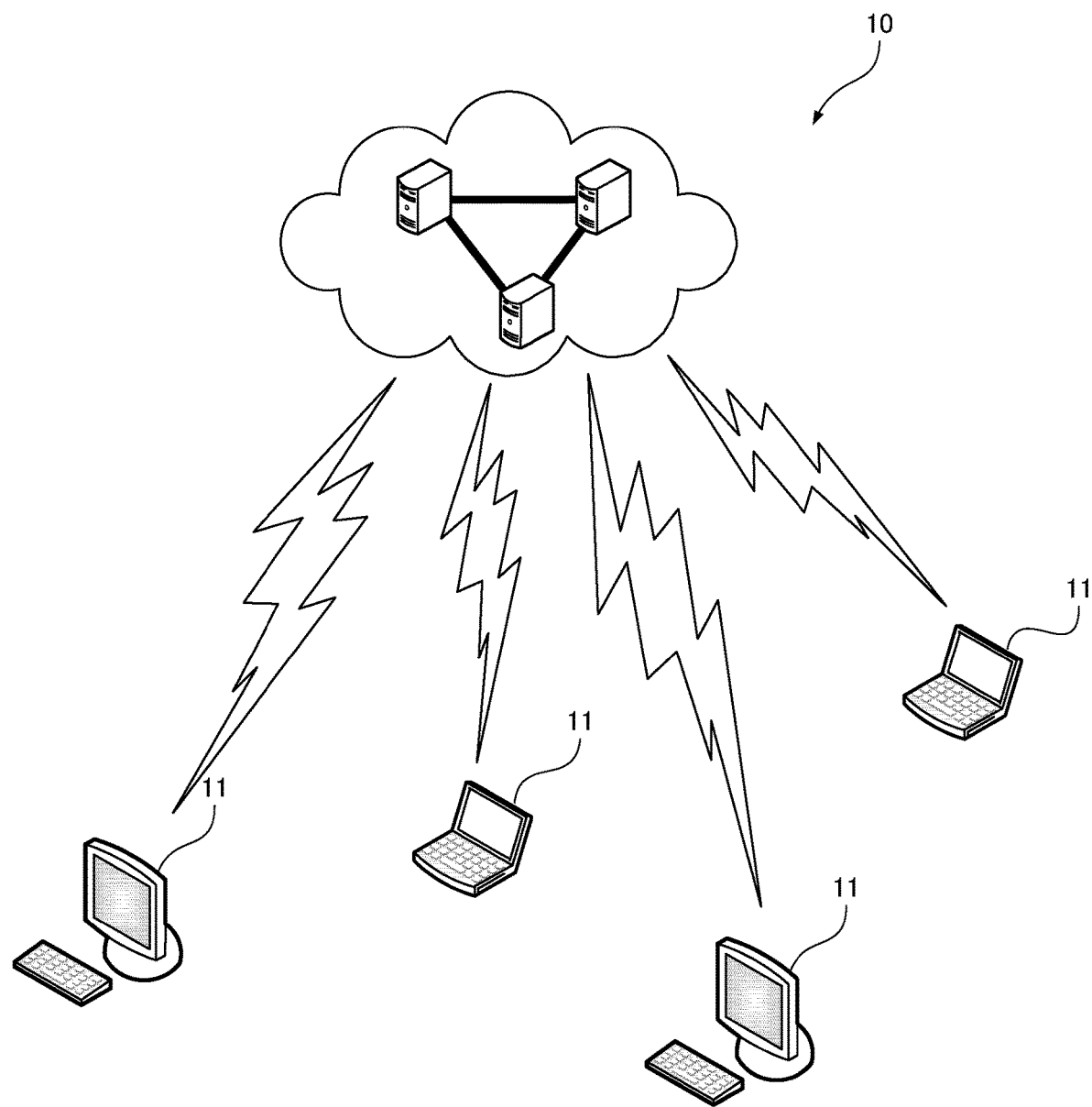
FIG. 1 is a schematic diagram illustrating an overall configuration of a remote conference system including an image processing device according to an embodiment of the present disclosure.
Figure 2:
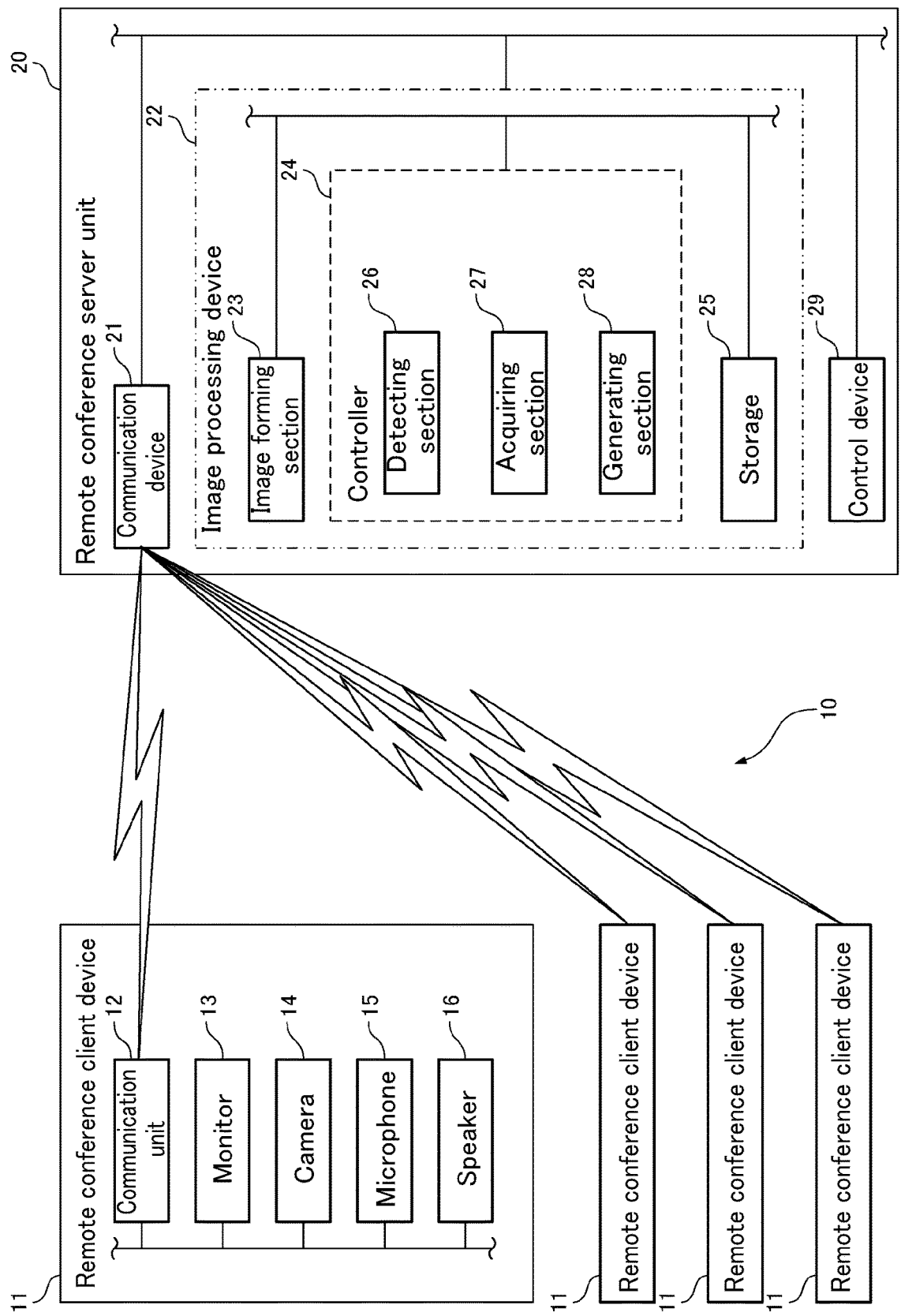
FIG. 2 is a system configuration diagram illustrating an overall configuration of the remote conference system including the image processing device.

The following describes an image processing device 22 according to an embodiment of the present disclosure with reference to the drawings. FIG. 1 is a schematic diagram illustrating an overall configuration of a remote conference system 10 including the image processing device 22 according to an embodiment of the present disclosure. It should be noted that the image processing device 22 is not illustrated in FIG. 1 for simplification of the drawing. FIG. 2 is a system configuration diagram illustrating an overall configuration of the remote conference system 10 including the image processing device 22 according to the embodiment of the present disclosure. FIG. 3 illustrates an example of a screen 50 displayed on a monitor 13 of each remote conference client device 11 in the remote conference system 10.

As illustrated in FIGS. 1 and 2, the image processing device 22 is provided in the remote conference system 10, for example. The remote conference system 10 is a communication conference system in which a plurality of participants perform one-way or two-way communication remotely. As illustrated in FIG. 1, the participants operate remote conference client devices 11 from, for example, their homes, their workplaces (e.g., their desks or conference rooms at their workplaces), or other places to participate in a remote conference. As illustrated in FIGS. 1 and 2, the remote conference system 10 includes a plurality of remote conference client devices 11 and a remote conference server unit 20.

The remote conference client devices 11 are communication devices assigned to the respective participants for participating in the remote conference. The remote conference client device 11 communicates with the remote conference server unit 20, and may be a smart phone, a tablet, a desktop computer, a laptop computer, or a television receiver, for example. The remote conference client devices 11 each mainly includes a communication unit 12, a monitor 13 (an example of a "display device"), a camera 14, a microphone 15, and a speaker 16.

In each of the remote conference client devices 11, the communication unit 12 communicates with the remote conference server unit 20. The communication unit 12 transmits image data and audio data generated in the remote conference client device 11 thereof to the remote conference server unit 20. The communication unit 12 receives image data and audio data generated in the remote conference server unit 20. The communication unit 12 outputs the received image data to the monitor 13. The communication unit 12 outputs the received audio data to the speaker 16.

The monitor 13 displays image data generated in the remote conference client device 11 and image data generated in the remote conference server unit 20 (image processing device 22).

The camera 14 includes a lens and a light-receiving element which are not illustrated, for example. The camera 14 captures participants, for example, in the remote conference, and generates image data. The image data generated by the camera 14 is output to monitor 13 and communication unit 12.

The participant uses the microphone 15 to speak in the remote conference. When the participant speaks to the microphone 15, an audio signal is output to the speaker 16 and the communication unit 12.

The speaker 16 outputs audio data generated in the remote conference client device 11 and audio data received by the communication unit 12.

The remote conference server unit 20 is a host control processor for hosting the remote conferences. As illustrated in FIG. 2, the remote conference server unit 20 mainly includes a communication device 21, an image processing device 22, and a control device 29. The control device 29 controls the remote conference server unit 20.

The communication device 21 is communicably connected to the communication unit 12 of each remote conference client device 11. The communication device 21 transmits and receives image data and audio data to and from the communication unit 12 of each remote conference client device 11. In other words, the communication device 21 is a distribution mean for distributing individual images and sounds from the remote conference server unit 20 to each remote conference client device 11. Communication between the communication device 21 and the communication unit 12 may be wired communication or wireless communication.

The image processing device 22 generates image data of the screen 50 displayed on the monitor 13 of each remote conference client device 11. The image processing device 22 mainly includes an image forming section 23, a controller 24, and storage 25.

Figure 3A:
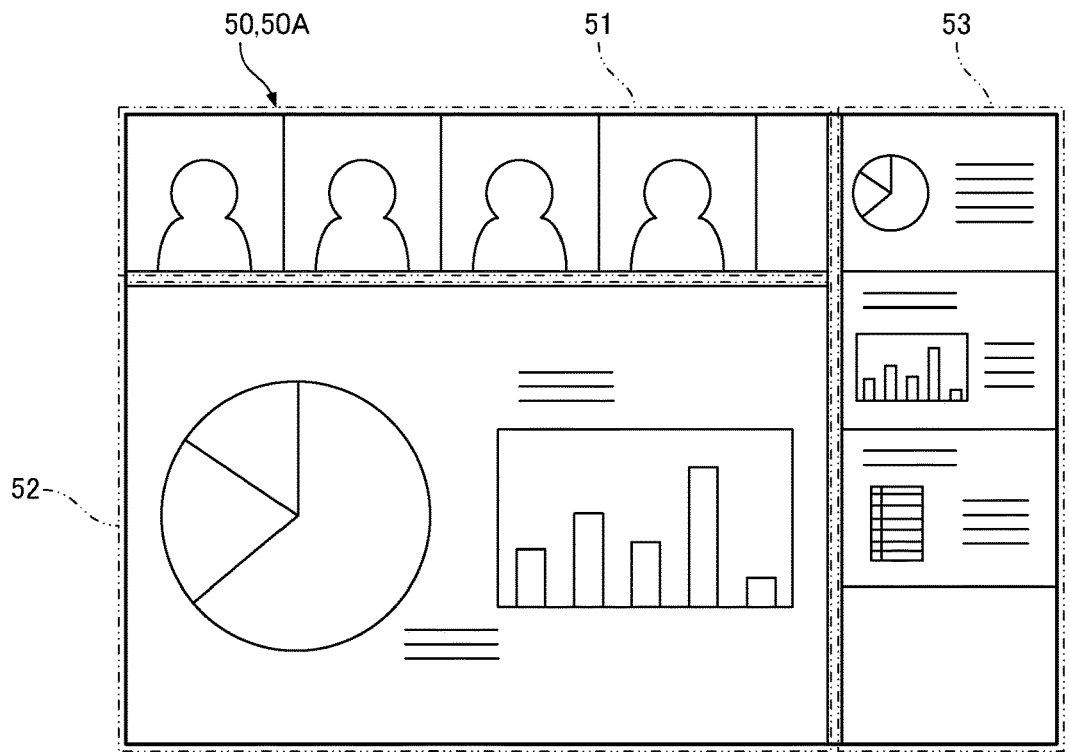
FIG. 3A is a diagram illustrating a first example of a screen displayed on a monitor of each remote conference client device in the remote conference system.
Figure 3B:
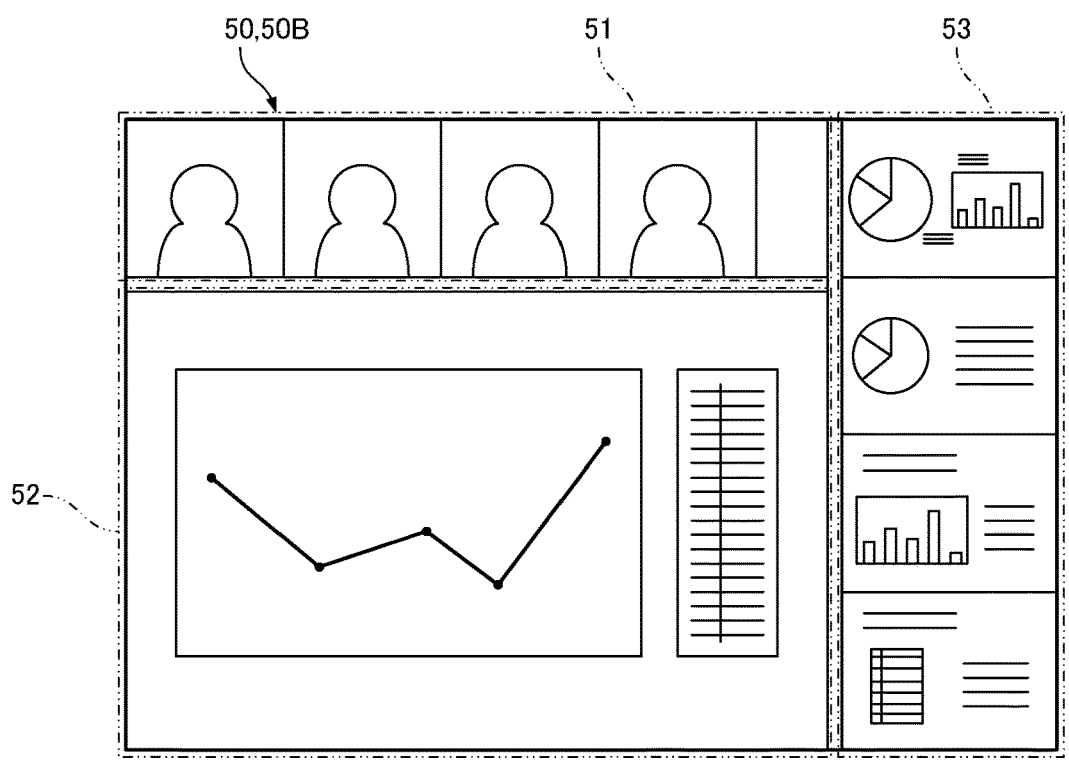
FIG. 3B is a diagram illustrating a screen displayed on a monitor of each remote conference client device in a remote conference system in a second example.

The image forming section 23 generates a screen (image) displayed on the monitor 13 of each remote conference client device 11 based on image data and the like transmitted from each remote conference client device 11. The image forming section 23 forms a screen 50 as illustrated in FIGS. 3A and 3B, for example. Specifically, the screen 50 in FIG. 3A is formed by the image forming section 23 at a predetermined time in the remote conference. The screen 50 in FIG. 3B is formed by the image forming section 23 after formation of the first screen 50A. Hereinafter, the screen 50 in FIG. 3A may be referred to as a first screen 50A. The screen 50 in FIG. 3B may be referred to as a second screen 50B.

As illustrated in FIGS. 3A and 3B, the screen 50 mainly includes a participant display area 51, a conference material display area 52, and a capture history list display area 53, for example.

The participant display area 51 is a region for displaying each participant participating in the remote conference. The conference material display area 52 is a region for displaying either or both a material and a slide used in the remote conference. The capture history list display area 53 is a region for displaying a list of screen captures of the screen 50. The screen captures displayed in the capture history list display area 53 are formed by the image forming section 23. Specifically, each of the screen capture displayed in the capture history list display area 53 is formed based on a snapshot of the screen 50 acquired by the acquiring section 27. In the capture history list display area 53, the screen captures are sequentially displayed in correspondence with snapshots of the screens 50 successively acquired by the acquiring section 27, for example.

The controller 24 performs overall control on the image processing device 22. The controller 24 includes a detecting section 26, an acquiring section 27, and a generating section 28.

The detecting section 26 detects a difference between the screens 50 displayed on the monitor 13 of each remote conference client device 11. Specifically, the detecting section 26 detects a difference between the screens 50 based on the image data generated by the image forming section 23. For example, the detecting section 26 extracts image data generated by the image forming section 23 at predetermined time intervals, and compares the extracted image data to detect the difference between the screens 50. Specifically, the detecting section 26 compares the pixel values of the extracted screen 50, thereby detecting the difference between the screens 50. More specifically, as illustrated in FIGS. 3A and 3B, the detecting section 26 extracts the image data of the first screen 50A and the image data of the second screen 50B, and compares the extracted image data of the first screen 50A with the extracted image data of the second screen 50B, thereby detecting the difference between the first screen 50A and the second screen 50B. The detecting section 26 compares the pixel values of the first screen 50A and the pixel values of the second screen 50B to detect the difference between the first screen 50A and the second screen 50B, for example.

The detecting section 26 calculates an amount of change of the screen 50 from the detected difference between the screens 50. Specifically, the detecting section 26 calculates an amount of change between the first screen 50A and the second screen 50B from the detected difference between the first screen 50A and the second screen 50B. The detecting section 26 monitors the amount of change of the screen 50 that changes as the remote conference progresses, based on the calculated amount of change of the screen 50.

The detecting section 26 is set to detect, in a predetermined area that is arbitrarily determined within the screen 50, a change which is a reference for detecting the difference between the screens 50. For example, the detecting section 26 may be set to detect the change in the entirety of the screen 50 illustrated in FIGS. 3A and 3B. Alternatively, the detecting section 26 may be set to detect the change only in the conference material display area 52 within the screen 50 illustrated in FIGS. 3A and 3B. In the remote conference, the participants are displayed in the participant display area 51 of the screen 50. Erroneous detection of the change position by the detecting section 26 can be prevented by excluding the participant display area 51 from the change detection target.

A threshold of the amount of change of the screen 50, which is to be detected as the difference between the screens 50 by the detecting section 26, is arbitrarily determined. Here, the threshold of the amount of change of the screen 50 is arbitrarily determined by a user or a manufacturer. More specifically, the threshold is a value based on the amount of change of the screen 50 at a time when the screen 50 changes significantly due to page switching or topic change in the remote conference.

Moreover, the detecting section 26 is set to extract image data of the screen 50 at arbitrary intervals (time). For example, the detecting section 26 extracts the screen 50 at intervals of one minute after a remote conference start. In this case, the detecting section 26 extracts the image data of the first screen 50A one minute after the remote conference start, and further extracts the pixel data of the second screen 50B one minute after the image data of the first screen 50A is extracted (2 minutes after the remote conference start).

The acquiring section 27 acquires a snapshot of the screen 50 displayed on the monitor 13. The acquiring section 27 acquires snapshots of the screens 50 at predetermined intervals. Specifically, the acquiring section 27 acquires a snapshot of the first screen 50A after a predetermined time has elapsed since the remote conference started. The acquiring section 27 further acquires a snapshot of the second screen 50B after the predetermined time has elapsed since the snapshot of the first screen 50A has been acquired.

In a case in which the detecting section 26 is set to detect the change in an arbitrarily determined area, the acquiring section 27 acquires, for example, a snapshot of the arbitrarily determined area within the screen 50 (snapshot of the specific area within the screen 50). For example, in a case in which the detecting section 26 is set to detect the change only in the meeting material display area 52 within the screen 50, the acquiring section 27 acquires a snapshot of only the meeting material display area 52 within the screen 50. In this manner, the acquiring section 27 acquires a snapshot of the specific area of the screen 50, thereby achieving efficient acquisition of the snapshot of the screen 50. Moreover, the acquired snapshot of the screen 50 can be easily stored, distributed, and printed as a document. In addition, since only the document of the specific area (e.g., the meeting material display area 52) is generated, the user can efficiently review the meeting and confirm points that the user wants to know. It should be noted that the acquiring section 27 may acquire a snapshot of the screen 50 as a whole even in a case in which the detecting section 26 is set to detect the change in an arbitrarily determined area, for example.

The generating section 28 generates a document of the snapshot of the screen 50 acquired by the acquiring section 27. Specifically, when the amount of change between the first screen 50A and the second screen 50B calculated by the detecting section 26 is equal to or greater than the threshold, the generating section 28 generates a snapshot document of the first screen 50A. When the amount of change of the screen 50 calculated by the detecting section 26 is equal to or greater than the threshold, the generating section 28 determines that the screen 50 displayed on the monitor 13 is significantly changing (changes from the first screen 50A to the second screen 50B) due to page switching or topic change during the remote conference, and generates a snapshot document of the latest screen which is the screen 50 (the first screen 50A) immediately before the change. As a result, the user can easily review the remote conference by accessing the snapshot document of the screen 50 (the first screen 50A) generated by the generating section 28.

The document generated by the generating section 28 can be acquired from each remote conference client device 11, and can be printed by a printer (not illustrated) or the like as a snapshot of the screen 50. The document generated by the generating section 28 is associated with a snapshot of the screen 50 generated by the image forming section 23. The user may select one of the snapshots of the screen 50 displayed on the monitor 13 to display the selected snapshot of the screen 50 in an enlarged manner, or to print the corresponding screen 50.

The storage 25 is flash memory, for example. The storage 25 stores therein programs executed by the controller 24, data generated by execution of the programs by the controller 24, and data transmitted from each remote conference client device 11, and the like. The storage 25 stores the snapshot document of the screen 50 generated by the generating section 28. It should be noted that the participants of the remote conference can obtain the snapshot document of the screen 50 stored in the storage 25 from each remote conference client device 11. As a result, the participants can access the snapshot document of the screen 50 in the remote conference to efficiently obtain a snapshot of the data displayed on the screen 50 connected in the remote conference, and can save, distribute, and print the snapshot document.

The storage 25 also stores therein a capture history of the screen 50 generated by the image forming section 23. Examples of the capture history of the screen 50 include serial numbers of screen captures of the screen 50 assigned from the remote conference start, the elapsed time from the remote conference start, and the registration date and time of each screen capture of the screen 50.

Figure 4:
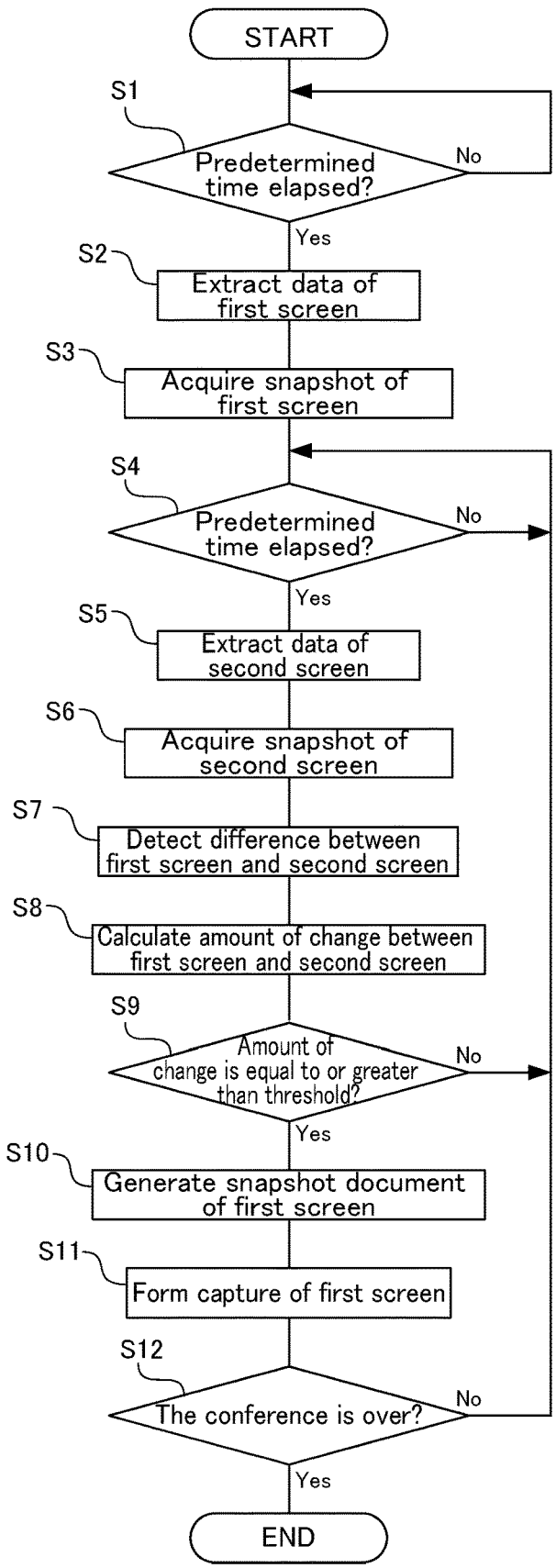
FIG. 4 is a flow chart illustrating an operation flow of the image processing device.

The following describes an operation of the image processing device 22. FIG. 4 is a flow chart illustrating an operation flow of the image processing device 22.

As illustrated in FIG. 4, upon a start of the remote conference, the controller 24 of the image processing device 22 measures the time from the remote conference start (Step S1). If the controller 24 determines that a predetermined time (e.g., one minute) has elapsed since the remote conference started (Yes in Step S1), the controller 24 causes the detecting section 26 to extract image data of the first screen 50A displayed on the monitor 13 after the predetermined time has elapsed from the remote conference start (Step S2). Moreover, the controller 24 causes the acquiring section 27 to acquire a snapshot of the first screen 50A (Step S3). Upon the acquiring section 27 acquiring the snapshot of the first screen 50A (Step S3), the controller 24 measures the time from the acquisition of the snapshot of the first screen 50A (Step S4). When the controller 24 determines that the predetermined time (e.g., 1 minute) has elapsed since the acquiring section 27 acquired the snapshot of the first screen 50A (Yes in Step S4), the detecting section 26 extracts image data of a second screen 50B displayed on the monitor 13 (Step S5). Thereafter, the acquiring section 27 acquires a snapshot of the second screen 50B (Step S6).

Upon the acquiring section 27 acquiring the snapshot of the second screen 50B (Step S6), the controller 24 causes the detecting section 26 to compare the extracted image data of the first screen 50A with the extracted image data of the second screen 50B to detect a difference between the first screen 50A and the second screen 50B. Upon the detecting section 26 detecting the difference between the first screen 50A and the second screen 50B (Step S7), the controller 24 causes the detecting section 26 to calculate an amount of change between the first screen 50A and the second screen 50B based on the difference between the first screen 50A and the second screen 50B.

Upon the detecting section 26 calculating the amount of change between the first screen 50A and the second screen 50B (Step S8), the controller 24 determines whether or not the calculated amount of change is equal to or greater than a threshold (Step S9). If the controller 24 determines that the calculated amount of change is smaller than the threshold (No in Step S9), the controller 24 measures the time after extraction of the image data of the second screen 50B (Step S4). In other words, the controller 24 determines that no page has been switched or no topic has changed in the remote conference, and measures the time until the next image data of the screen 50 is extracted.

If the controller 24 determines that the calculated amount of change is equal to or greater than the threshold (Yes in Step S9), the controller 24 causes the generating section 28 to generate a snapshot document of the first screen 50A (Step S10). In other words, the controller 24 determines that the page has been switched or topic has changed in the remote conference, and generates a snapshot document of a latest screen which is the first screen 50A immediately before the screen 50 has changed significantly. After the generating section 28 generates the snapshot document of the first screen 50A (Step S10), the image forming section 23 forms a screen capture of the first screen 50A (Step S11).

When the screen capture of the first screen 50A is formed (Step 11), the controller 24 determines whether or not the remote conference is over based on reception or non-reception of a signal from each remote conference client device 11 (Step S12). If the controller 24 determines that the remote conference is not over (No in Step S11), the controller 24 measures the time after extraction of the image data of the second screen 50B (Step S4). Furthermore, each time the controller 24 calculates an amount of change of the screen 50 exceeding the preset threshold (Yes in Step S9), the generating section 28 generates a snapshot document of the first screen 50A (Step S10), and the image forming section 23 forms a screen capture of the first screen 50A (step S11). If the controller 24 determines that the remote conference is over (Yes in step S12) by contrast, the operation of the image processing device 22 ends.

As described above, according to the embodiment of the present disclosure, the image processing device acquires a snapshot of the screen 50 (the first screen 50A) displayed on the monitor 13 at a time when the screen 50 changes significantly (changes from the first screen 50A to the second screen 50B), and generates a document of the acquired snapshot. Accordingly, the user can easily search for the screen at a time when the page is switched or topic changes in the remote conference, and the like based on the snapshot document. The user can also obtain information that cannot be obtained from any materials, such as the conference progress, occasional notes, and chat screens of the participants. As a result, the user can effectively review the remote conference. Moreover, even in a case in which the user has to leave for a while in the remote conference, the user can catch up the conference by accessing the snapshot history that the user has missed.

An embodiment of the present disclosure has been described above with reference to the drawings. However, the present disclosure is not limited to the above-described embodiment, and can be implemented in various aspects without departing from the gist of the present disclosure. The drawings mainly and schematically illustrate various constituent elements for ease of understanding. Aspects such as thickness, length, number, and intervals of each constituent element illustrated in the drawings may differ in practice for convenience of drawing preparation. Furthermore, aspects such as material, shape, and dimension of each constituent element illustrated in the above embodiment are merely examples and not particular limitations. Various changes can be made without substantially deviating from the configuration of the present disclosure.

What is claimed is:

1. An image processing device for processing screen data displayed on a display device in a remote conference, comprising:

a detecting section configured to compare a first screen displayed on the display device and a second screen displayed on the display device after the first screen, and detect a difference between the first screen and the second screen;

an acquiring section configured to acquire a snapshot of a screen displayed on the display device; and a generating section configured to generate a document of the snapshot, wherein the acquiring section acquires a snapshot of the first screen and a snapshot of the second screen, the detecting section calculates an amount of change between the first screen and the second screen based on the difference between the first screen and the second screen, and when a result of calculation by the detecting section is equal to or greater than a threshold, the generating section generates a document of the snapshot of the first screen acquired by the acquiring section, and wherein the acquiring section acquires a snapshot of a specific area within the first screen displayed on the display device and a snapshot of a specific area within the second screen displayed on the display device, the specific area within the first screen and the specific area within the second screen are located at the same location.

2. An image processing device for processing screen data displayed on a display device in a remote conference, comprising:

a detecting section configured to compare a first screen displayed on the display device and a second screen displayed on the display device after the first screen, and detect a difference between the first screen and the second screen;

an acquiring section configured to acquire a snapshot of a screen displayed on the display device; and a generating section configured to generate a document of the snapshot, wherein the acquiring section acquires a snapshot of the first screen and a snapshot of the second screen, the detecting section calculates an amount of change between the first screen and the second screen based on the difference between the first screen and the second screen, and when a result of calculation by the detecting section is equal to or greater than a threshold, the generating section generates a document of the snapshot of the first screen acquired by the acquiring section, and wherein the detecting section calculates an amount of change between a specific area within the first screen displayed on the display device and a specific area within the second screen displayed on the display device, the specific area within the first screen and the specific area within the second screen are located at the same location, and when the result of the calculation by the detecting section is equal to or greater than the threshold, the generating section generates a document of the snapshot of the specific area within the first screen.

* * * * *